(12) United States Patent
Eo et al.

(10) Patent No.: US 11,565,694 B2
(45) Date of Patent: Jan. 31, 2023

(54) CRUISE CONTROL METHOD FOR HYBRID VEHICLE

(71) Applicants: Hyundai Motor Company, Seoul (KR); Kia Motors Corporation, Seoul (KR)

(72) Inventors: Jeong Soo Eo, Gyeonggi-do (KR); Sung Jae Kim, Gyeonggi-do (KR); Ji Won Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 360 days.

(21) Appl. No.: 16/675,809

(22) Filed: Nov. 6, 2019

(65) Prior Publication Data

US 2020/0361461 A1    Nov. 19, 2020

(30) Foreign Application Priority Data

May 13, 2019 (KR) .................. 10-2019-0055461

(51) Int. Cl.
| | | |
|---|---|---|
| *B60W 10/00* | (2006.01) | |
| *B60W 30/14* | (2006.01) | |
| *B60W 10/06* | (2006.01) | |
| *B60W 10/08* | (2006.01) | |
| *B60W 20/10* | (2016.01) | |
| *B60K 6/387* | (2007.10) | |

(52) U.S. Cl.
CPC .............. *B60W 30/14* (2013.01); *B60K 6/387* (2013.01); *B60W 10/06* (2013.01); *B60W 10/08* (2013.01); *B60W 20/10* (2013.01); *B60W 2510/244* (2013.01); *B60W 2552/15* (2020.02); *B60W 2554/804* (2020.02); *B60W 2710/06* (2013.01); *B60W 2710/08* (2013.01); *B60W 2720/106* (2013.01); *B60Y 2200/92* (2013.01)

(58) Field of Classification Search
USPC ........................................................ 701/22
See application file for complete search history.

(56) References Cited

U.S. PATENT DOCUMENTS

| | | | |
|---|---|---|---|
| 2013/0103238 A1 | 4/2013 | Yu et al. | |
| 2013/0226420 A1 | 8/2013 | Pedlar et al. | |
| 2014/0195116 A1* | 7/2014 | Hrovat | B60W 10/22 |
| | | | 701/38 |
| 2014/0371986 A1* | 12/2014 | Hrovat | B60G 17/0164 |
| | | | 701/38 |

FOREIGN PATENT DOCUMENTS

| | | | | |
|---|---|---|---|---|
| DE | 102013114954 A1 * | 7/2014 | ......... | B60G 17/0195 |
| WO | WO-2017199560 A1 * | 11/2017 | ............ | B60W 30/16 |
| WO | WO-2017221233 A1 * | 12/2017 | ............ | B60W 30/14 |

* cited by examiner

*Primary Examiner* — James M McPherson
(74) *Attorney, Agent, or Firm* — Fox Rothschild LLP

(57) ABSTRACT

A cruise control method for a hybrid vehicle is provided. The method includes detecting a preceding vehicle and estimating the speed of the preceding vehicle from the information input from a preceding vehicle detecting unit in the on state of a cruise mode and a PnG mode. An upper limit target vehicle speed and a lower limit target vehicle speed are determined from the estimated speed of the preceding vehicle. The driving source of the vehicle is operated to alternately repeat the acceleration (pulse phase) and deceleration (glide phase) of the vehicle between the determined upper limit target vehicle speed and lower limit target vehicle speed.

16 Claims, 7 Drawing Sheets

● : OPERATING POINT DURING NORMAL CONSTANT-SPEED CRUISE TRAVELING

CRUISE CONTROL METHOD FOR HYBRID VEHICLE

CROSS-REFERENCE TO RELATED APPLICATION

This application claims under 35 U.S.C. § 119(a) the benefit of priority to Korean Patent Application No. 10-2019-0055461 filed on May 13, 2019, the entire contents of which are incorporated herein by reference.

BACKGROUND

(a) Technical Field

The present disclosure relates to a cruise control method for a hybrid vehicle, and more particularly, to a cruise control method for a hybrid vehicle, which performs an optimum Pulse and Glide traveling (traveling in which the acceleration and deceleration of a vehicle are periodically alternated) control based on the information collected in the vehicle, thereby maximizing fuel economy.

(b) Background Art

Generally, a cruise control device for a vehicle is a device that controls the automatic traveling of the vehicle at the vehicle speed set by a driver, and has been developed as a system for operating the vehicle to collect the information regarding a preceding vehicle in real time using a sensor mounted within the vehicle and maintain the suitable inter-vehicle distance based on the collected real-time information, in addition to a constant-speed traveling control for maintaining and fixing the vehicle speed constantly.

Such a cruise control device operates the vehicle to maintain the vehicle speed set by the driver (e.g., cruise setting vehicle speed) and the safety distance with the preceding vehicle, thereby assisting the safety traveling of the vehicle even when the driver does not operate an accelerator pedal and a brake pedal, and operates the pedal by the driver to be reduced, thereby enhancing driving convenience.

In a normal cruise control device, when the required torque (cruise torque) for maintaining the vehicle speed set by the driver is determined, a constant-speed traveling control is performed to maintain the vehicle speed set by the driver, that is, the setting vehicle speed constantly by adjusting the engine driving to output the required torque in the case of an internal combustion engine (ICE) vehicle such as a gasoline or diesel vehicle. In addition, a pure battery electric vehicle (BEV) that operates only by a motor using battery power operates the motor torque with the required torque to maintain the setting vehicle speed, and a hybrid electric vehicle (HEV/PHEV) that operates using a motor and an engine distributes power to the motor and the engine to output the combined power corresponding to the required torque.

Meanwhile, as shown in FIG. 1, the engine operating point during constant-speed cruise traveling in the internal combustion engine vehicle is determined by the vehicle speed and the shift stage independently of an engine optimal operating line (hereinafter referred to as 'OOL'). Therefore, the constant-speed cruise traveling of the internal combustion engine vehicle has the disadvantage in terms of fuel economy, and therefore, an improved vehicle automatic traveling control, that is, an auto cruise control technology capable of enhancing fuel economy is being suggested.

Particularly, required is a cruise control technology capable of enhancing fuel economy in the hybrid vehicle using the engine and the motor as the driving source of the vehicle.

The above information disclosed in this section is merely for enhancement of understanding of the background of the disclosure and therefore it may contain information that does not form the prior art that is already known in this country to a person of ordinary skill in the art.

SUMMARY

Therefore, the present disclosure provides a cruise control method, which may perform an optimum PnG traveling (traveling in which the acceleration and deceleration of the vehicle are alternately and repeatedly performed) control based on the preceding vehicle information and the forward road information collected in a hybrid vehicle in which the ON/OFF of an engine is possible while operating the vehicle in real time, and the system limit information of the vehicle, etc., thereby minimizing the loss in the power electronic (PE) component, and enhancing fuel economy.

For achieving the object, according to an exemplary embodiment of the present disclosure, a cruise control method for a hybrid vehicle may include sensing whether a Pulse and Glide (PnG) mode has been operated by a controller in a vehicle, after a setting vehicle speed has been set by a driver and a cruise mode has been turned on in a hybrid vehicle using an engine and a motor as the driving source of the vehicle; estimating the speed of a preceding vehicle traveling in front of the vehicle from the information input from a preceding vehicle detecting unit in the on state of the PnG mode; determining an upper limit target vehicle speed and a lower limit target vehicle speed from the estimated speed of the preceding vehicle; and operating the driving source of the vehicle to alternately repeat the acceleration (pulse phase) and deceleration (glide phase) of the vehicle between the determined upper limit target vehicle speed and lower limit target vehicle speed.

As a result, according to the cruise control method for the hybrid vehicle according to the present disclosure, it may be possible to perform the optimum PnG traveling control based on the preceding vehicle information and the forward road information collected in real time in the hybrid vehicle, and the system limit information of the vehicle, etc., thereby minimizing the loss in the Power Electronic component, and enhancing the fuel economy.

BRIEF DESCRIPTION OF THE DRAWINGS

The above and other features of the present disclosure will now be described in detail with reference to exemplary embodiments thereof illustrated the accompanying drawings which are given herein below by way of illustration only, and thus are not limitative of the present disclosure, and wherein.

Figure 1:
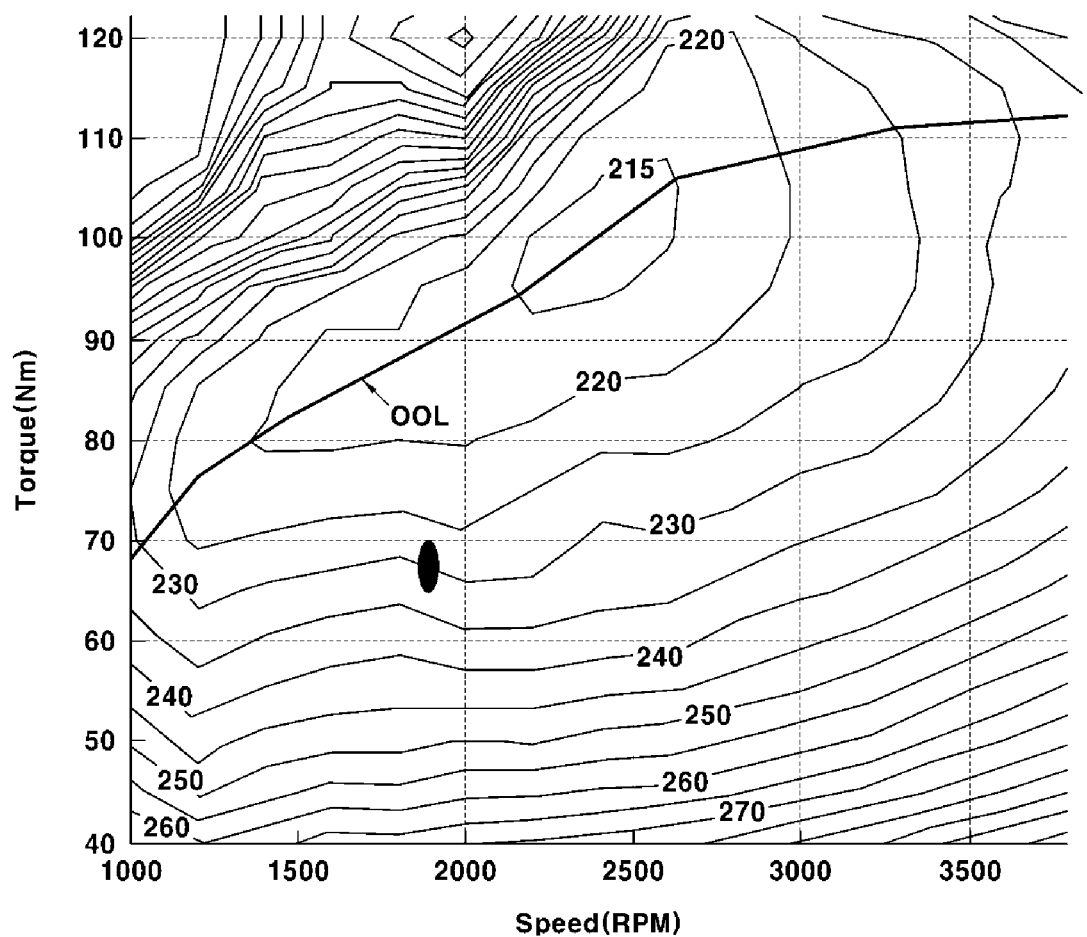
FIG. 1 is a diagram showing the operating point of an engine during the general constant-speed cruise traveling of an internal combustion engine vehicle according to the related art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in unit by the particular intended application and use environment. In the drawings, reference numbers refer to the same or equivalent units of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings so that those skilled in the art to which the present disclosure pertains may easily practice the present disclosure. However, the present disclosure is not limited to the exemplary embodiments described herein but may also be embodied in other forms.

Various cruise control methods have been proposed in order to solve the problem of a reduction in fuel economy in a known cruise control method for an internal combustion engine vehicle, particularly, a normal cruise control method for maintaining a constant speed. For example, during cruise traveling, the utility for a Pulse and Glide (hereinafter, referred to as "PnG") traveling pattern, in which the acceleration and deceleration of the vehicle are periodically repeated and alternated rather than maintaining a constant-speed traveling, thereby enhancing fuel economy on the actual road, is being verified in various ways.

Figure 2:
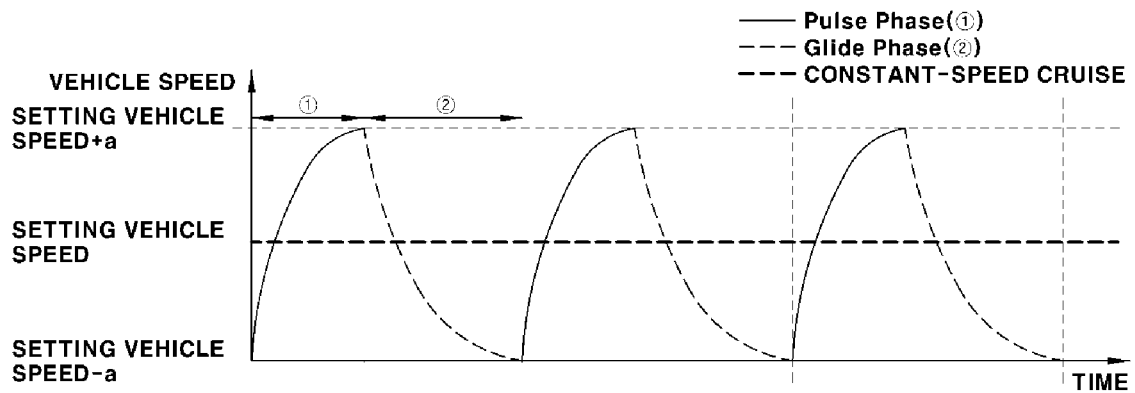
FIG. 2 is a diagram exemplifying a general PnG traveling state according to the related art.

FIG. 2 is a diagram exemplifying a known PnG traveling state for an internal combustion engine vehicle, which graphically exemplifies a vehicle speed control state with time. As shown, the PnG traveling refers to a traveling pattern in which the acceleration and deceleration of the vehicle are periodically repeated while maintaining an average vehicle speed at a setting vehicle speed (e.g., vehicle speed set by a driver).

During the PnG traveling or operation of the vehicle, the pulse phase in which the vehicle is accelerated and the glide phase in which the vehicle is decelerated are periodically repeated even without the operations of the accelerator pedal and the brake pedal of the driver. In the pulse phase during acceleration, the vehicle travels by operating the engine at the point having excellent engine efficiency by moving the operating point of the engine close to the OOL while increasing the vehicle speed. In addition, the glide phase during deceleration is a pattern in which energy may be recovered by the motor during coast traveling that travels by inertia, thereby reducing the total amount of fuel consumed during cruise traveling compared to the normal constant-speed cruise traveling.

Referring to FIG. 2, in the pulse phase during PnG traveling after a target vehicle speed has been set by the driver in the internal combustion engine vehicle, the vehicle is accelerated to a speed higher than a driver setting vehicle speed ('setting vehicle speed+a'). In addition, in the glide phase, the vehicle is decelerated by coast traveling in the engine fuel cut and the transmission neutral state, and the vehicle is decelerated to a speed lower than the driver setting vehicle speed ('setting vehicle speed−a').

As described above, the cruise control for the vehicle is performed to periodically repeat and alternate the pulse phase and the glide phase even without the pedal operation of the driver during PnG traveling for the purpose of enhancing fuel economy, and this PnG traveling control contributes to the development of automatic traveling control that is distinguished from the normal constant-speed cruise traveling.

In other words, unlike the normal constant-speed cruise traveling that constantly maintains the vehicle speed during traveling at the driver setting vehicle speed, the PnG traveling control refers to a control in which the acceleration and deceleration of the vehicle are periodically performed, that is, a control in which the pulse phase and the glide phase are alternated and repeated while maintaining the average vehicle speed while the vehicle is being driven at the setting vehicle speed. However, in applying the conventional PnG traveling control, since the variable amount of the vehicle speed (relevant to operation performance) and the amount of fuel save have the mutual tradeoff relationship, an optimum control technology capable of simultaneously fulfilling the enhancement of operating performance and fuel economy is required.

Particularly, a cruise control technology capable of enhancing fuel economy is required in the hybrid vehicle (HEV) using the engine (ICE) and the motor as the driving source of the vehicle, and a control technology capable of also applying the PnG traveling pattern for the purpose of enhancing fuel economy to the hybrid vehicle is required. In addition, required is an improved PnG traveling control technology, which may minimize the loss in the power electronic component such as a motor in the hybrid vehicle in which the ON/OFF of the engine is possible while the vehicle is being driven, thereby maximizing fuel economy.

The related art discloses technologies for following the operating point having excellent efficiency on an engine Brake Specific Fuel Consumption (BSFC) Map. For example, a technique in the related art discloses a control device and method for implementing the PnG function in the normal internal combustion engine vehicle, and more specifically, discloses a technology that performs a control of following the upper limit and lower limit target vehicle speeds set based on a reference vehicle speed at the vehicle speed control, and at this time, follows the upper limit and lower limit target vehicle speeds through the increase and decrease of the fuel amount to a combustion chamber.

In addition, another technique in the related art discloses a device and a method for minimizing the vehicle speed fluctuation and enhancing fuel economy by PnG-minutely adjusting a throttle value, and more specifically, discloses a technology for providing the pulse of a fast period to the throttle value without vehicle speed fluctuation, and moving the engine operating point to the operating point having excellent efficiency on the BSFC map, thereby enhancing fuel economy.

In this regard, the present disclosure relates to a control method for implementing the PnG function in the hybrid vehicle using the engine and the motor as the driving source, and an object of the present disclosure is to apply the PnG traveling pattern considering the characteristics of the hybrid vehicle, thereby further maximizing the fuel economy enhancement effect. Particularly, the present disclosure is characterized in that a preceding vehicle following intelligent PnG traveling control is performed, and a main object of the present disclosure is to provide a cruise control method for performing an optimum PnG traveling control based on the preceding vehicle information and the forward road information collected in real time in the hybrid vehicle, the system limit information of the vehicle, etc., thereby further enhancing the fuel economy.

In the present disclosure, when the PnG mode is selected for the cruise traveling of the hybrid vehicle, the PnG control of repeating the vehicle acceleration (pulse phase; OOL-oriented traveling) and the vehicle deceleration (glide phase) may be performed based on the preceding vehicle information while allowing the average vehicle speed to follow the vehicle speed set by the driver (e.g., setting vehicle speed), thereby enhancing fuel economy. In addition, in the present disclosure, the pause or the return, etc. of the PnG control may be selected according to the forward road information or the system limit information of the vehicle, etc. as described later.

In the present disclosure, during PnG traveling, a control for following the upper limit and lower limit target vehicle speeds may be performed while varying the required torque for the acceleration and deceleration of the vehicle, a motor control may be performed to output the torque satisfying the required torque necessary for the vehicle acceleration (pulse phase) is output, or a torque distribution control for the engine and the motor may be performed.

The present disclosure may be applied to the known hybrid vehicles, for example, a HEV, a Plug-in HEV (PHEV), a Mild HEV (MHEV), etc. In addition, the present disclosure may be applied to a transmission mounted electric device (TMED) type hybrid vehicle to which a transmission is connected to the output side of a motor as an example of the known hybrid vehicle. In the TMED type hybrid vehicle, an engine and a motor, which are two driving sources of the vehicle, are disposed in series, an engine clutch is disposed between the engine and the motor, and a transmission is disposed at the output side of the motor.

In the TMED type hybrid vehicle, the engine clutch connects between the engine and the motor to be power-transferable or prevents power transfer from being performed, and during EV mode traveling, the engine clutch is separated and the vehicle travels by the motor power. During HEV mode traveling, the vehicle travels with the combined power of the engine and the motor in a state where the engine clutch has been closed. In addition, at the braking of the vehicle or during coast traveling by inertia, the motor is operated as a generator to perform the energy recovery that charges the battery.

In the present disclosure, the controller may be configured to apply the coast regenerative torque may be applied to the motor in the glide phase in which the vehicle is decelerated during PnG traveling. In other words, during the glide phase in which the hybrid vehicle performs coast traveling in the PnG mode, the motor may operate as a generator to convert the mechanical energy of the rotational force transferred through a driving wheel into electric energy, and at this time, the electric energy generated by the motor may be stored in a battery to charge the battery.

Then, the hybrid vehicle to which the present disclosure is applied may be provided with an engine control unit (ECU) configured to operate an engine, a motor control unit (MCU) configured to operate a motor, a transmission control unit (TCU) configured to operate a transmission and an engine clutch, a battery management system (BMS) configured to operate and manage a battery, etc., together with a hybrid control unit (HCU) configured to execute the overall operation of the vehicle.

In addition, in the hybrid vehicle, an operation of each device may be performed through the cooperative control between the controllers using the hybrid control unit (HCU)

as an upper controller. For example, the transmission control unit (TCU) may be configured to operate a hydraulic actuator according to the instruction of the HCU to close or open the engine clutch. The cooperative control between the controllers may also be performed in a vehicle speed control procedure during the cruise traveling (e.g., PnG traveling and normal constant-speed cruise traveling) according to the present disclosure, and the operations of the engine, the motor, the transmission, and the engine clutch may be executed by the corresponding controllers.

Although the plurality of controllers for operating each device in the vehicle have been described above, an integrated control means instead of the plurality of controllers may be used for the cruise control according to the present disclosure, and in the present specification, all of the controllers or the integrated control means will be collectively referred to as a controller for performing the cruise control according to the present disclosure.

Figure 3:
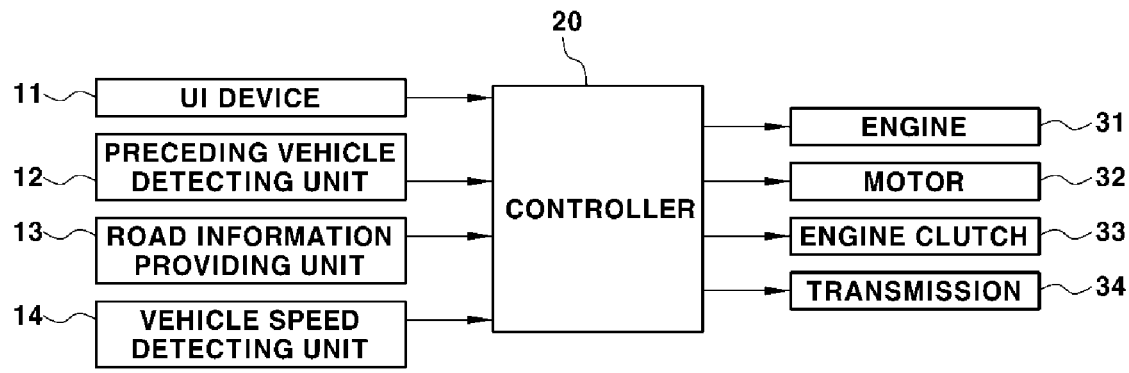
FIG. 3 is a block diagram showing a configuration of a system for performing a cruise control according to an exemplary embodiment of the present disclosure.
Figure 4:
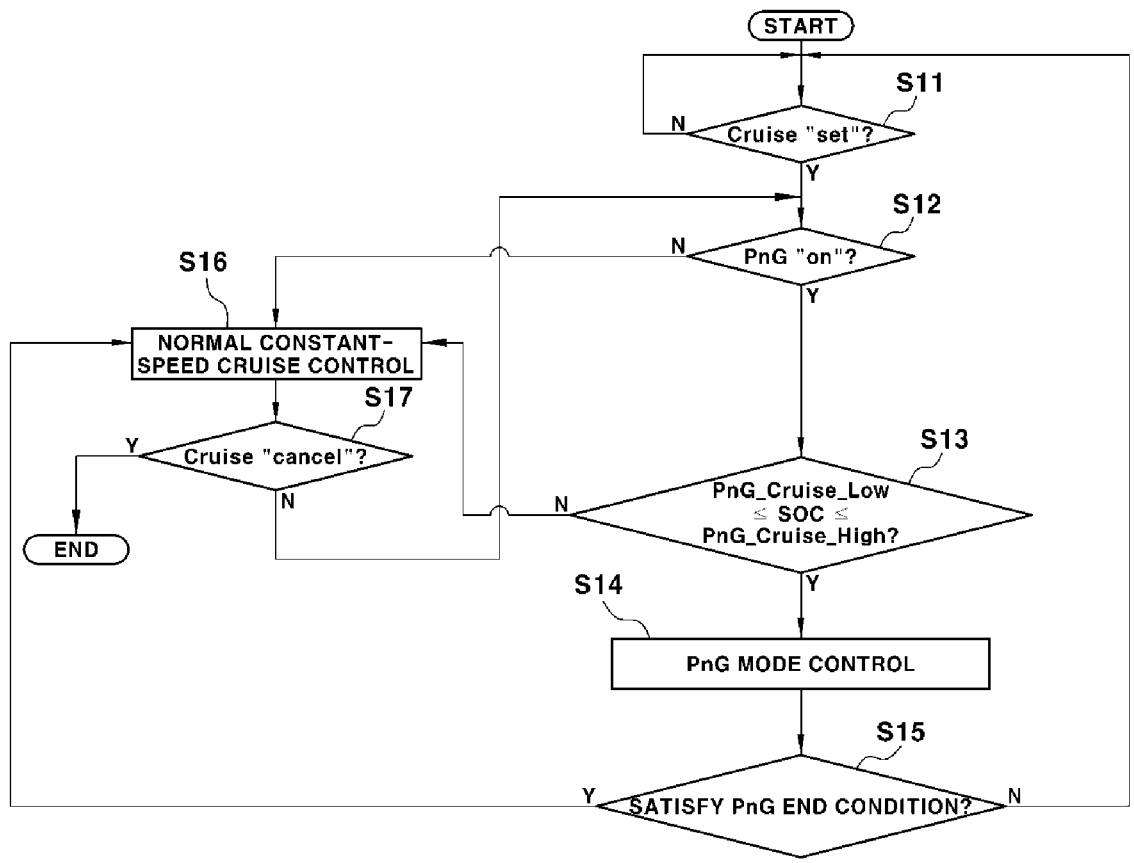
FIG. 4 is a flowchart showing a cruise control method according to an exemplary embodiment of the present disclosure.

FIG. 3 is a block diagram showing a configuration of a system for performing a cruise control according to the present disclosure, and FIG. 4 is a flowchart showing a cruise control method according to the present disclosure. As shown, a system for performing a cruise control according to the present disclosure may include a UI device 11, a preceding vehicle detecting unit 12, a road information providing unit 13, a vehicle speed detecting unit 14, and a controller 20, and the operations of an engine 31 and a motor 32, an engine clutch 33, and a transmission 34 may be executed by the controller 20. The cruise control according to the present disclosure may be started by turning on a cruise mode in response to receiving a desired vehicle speed from a driver by operating a predetermined user interface (UI) device 11 such as a button or a switch in the vehicle (Cruise "set").

As described above, the start by the turn-on of the cruise mode means that the cruise control of the present disclosure for automatically controlling the vehicle speed is started even without the normal acceleration and deceleration driving operation of the driver. In the present disclosure, the vehicle speed at which the driver sets by operating the UI device 11, that is, the setting vehicle speed becomes an average vehicle speed when the vehicle travels in the PnG mode in which acceleration and deceleration are alternately repeated, and in the normal constant-speed cruise mode described later, the setting vehicle speed becomes a target vehicle speed for maintaining the constant-speed traveling of the vehicle.

Then, the driver is subject to turn on the PnG mode through the UI device 11 (PnG "on"), and the cruise control mode of the present disclosure may include the PnG mode performed when the driver turns on the PnG mode through the UI device 11, and the normal constant-speed cruise mode performed in a PnG off state where the setting vehicle speed has been set but the PnG mode is not turned on.

As described above, in the present disclosure, the UI device 11 may be provided with the vehicle so as to perform by distinguishing the operation for setting the setting vehicle speed by the driver, that is, the operation for turning on/off the cruise mode, and the operation for turning on/off the PnG mode. The UI device 11 may be a button or a switch, etc., and the driver may set the setting vehicle speed by operating the UI device 11 to turn on the cruise mode (Cruise "set"), and this means that the cruise control has been selected by the driver to operate, and thus, the controller 20 may be configured to receive a signal according to the operation thereof from the UI device 11 to detect that the cruise mode has been turned on by the driver.

Further, the PnG mode may also be turned on by operating the UI device 11 such as a button or a switch in the vehicle by the driver (PnG "on"), and this means that the PnG mode control has been selected by the driver to operate, and thus, the controller 20 may be configured to receive a signal according to the operation thereof from the UI device 11 to detect that the PnG function has been turned on by the driver. Of course, the operation for turning on/off the cruise mode in the UI device 11, and the operation for turning on/off the PnG mode should be set to be distinguishable.

Referring to FIG. 4, the controller 20 may be configured to determine whether the cruise mode has been turned on (Cruise "set") in S11, and determine whether the PnG mode has been turned on (PnG "on") by sensing whether the PnG mode has been operated in S12. In the present disclosure, when the PnG mode is turned on after the cruise mode has been turned on, the PnG mode may be performed, and when the PnG mode is not turned on and the off state is maintained, the normal constant-speed cruise control may be performed.

The PnG mode is a traveling mode that operates the vehicle so that the acceleration (pulse phase) and deceleration (glide phase) of the vehicle are periodically repeated and alternated, and the normal constant-speed cruise mode is a traveling mode that operates the vehicle to perform the constant-speed traveling while maintaining the vehicle speed set by the driver. When the PnG mode control is performed, to adjust the vehicle deceleration slope (vehicle deceleration) in the glide phase section that is a deceleration section, the controller 20 may be configured to maintain the transmission 34 in an in gear state, and in the open of the engine clutch 33 and the engine fuel cut state, may be configured to apply the adjusted coast regenerative torque to the motor 32.

Then, when the PnG mode control is performed, in the pulse phase section that is an acceleration section, the engine operating point may be determined on the optimal operating line (OOL) during HEV mode traveling, and the engine 31 may be operated at the operating point on the OOL having excellent efficiency, that is, the optimum operating point, and at this time, a torque distribution control for the engine 31 and the motor 32 may be performed to output the torque satisfying the required torque. In other words, the engine 31 may be operated to output the OOL torque corresponding to the operating point of the OOL, and at this time, the motor 32 may be drive-controlled or recovery-controlled so that the sum of the engine torque (OOL torque) and the motor torque satisfies the required torque.

In addition, in an exemplary embodiment of the present disclosure, while the vehicle is operated by the controller to travel in the normal constant-speed cruise mode in the off state of the PnG mode after the cruise mode has been turned on, the controller 20 may be configured to terminate the cruise control, when the driver operates the UI device 11 to turn off the cruise mode (Cruise "cancel") S17.

Referring to FIG. 4, when the controller 20 determines the cruise mode off (Cruise "cancel") in the S17 while the normal constant-speed cruise control is performed by the controller 20 in the S16, the cruise control according to the present disclosure may be terminated. Then, when the driver has operated the UI device 11 to turn on the PnG mode in the S12 of FIG. 4, the controller 20 may be configured to determine whether a battery SOC that is the battery status information is within a range between a predetermined upper limit value PnG_Cruise_High and predetermined lower limit value PnG_Cruise_Low in the S13.

Herein, when the battery SOC is within the range between the upper limit value and the lower limit value (PnG_Cruise_Low≤SOC≤PnG_Cruise_High), the controller 20 may be configured to operate the vehicle to travel in the PnG mode in the S14. However, when the battery SOC is not a value between the upper limit value and the lower limit value, the controller 20 may be configured to operate the vehicle to travel in the normal constant-speed cruise mode until the cruise mode is turned off by the driver S16.

In the present disclosure, when the normal constant-speed cruise mode has been selected as described above, the constant-speed traveling control that maintains the vehicle speed set by the driver at the cruise on, that is, the setting vehicle speed constantly may be performed by the controller 20. In the normal constant-speed cruise mode, the vehicle may be driven using the power of the motor 32 (in the EV mode), or using the combined power of the engine 31 and the motor 32 (in the HEV mode). In other words, when the normal constant-speed cruise mode is selected, the vehicle may be driven at the constant speed by the HEV mode or the EV mode determined based on the traveling condition in the in gear state of the transmission 34.

During HEV mode, the engine clutch 33 may be operated in the close state, and during EV mode traveling, the engine clutch 33 may be operated in the open state. In addition, since the engine power is not used in the EV mode, the engine 31 may be in the fuel cut state. In the normal constant-speed cruise mode, the driver setting vehicle speed becomes a target vehicle speed for constant-speed traveling, and the vehicle may be operated by the controller 20 to maintain the setting vehicle speed.

The normal constant-speed cruise mode is disadvantageous in terms of fuel economy compared with the PnG mode but is a mode having excellent vehicle driving performance, and during HEV mode, the engine operating point may be determined by the vehicle speed, the shift stage, etc. independently of the engine optimal operating line (hereinafter referred to as 'OOL'). In the normal constant-speed cruise mode, since the vehicle speed during traveling may be maintained constantly, it is superior to the PnG mode in which the increase and decrease of the vehicle speed are repeated in terms of the driving performance, but the power transfer efficiency may be determined by the power distribution state of the engine 31 and the motor 32, and the power used for charging and discharging is accompanied by a decrease in efficiency.

In addition, since the motor 32 or the motor 32 and the engine 31 should continuously output power to satisfy the required torque for maintaining the constant speed, fuel and electric energy should be continuously used, and as a result, the amounts of energy and fuel used may be increased in proportion to the traveling distance, thereby becoming disadvantageous in terms of fuel economy compared with the PnG mode. Alternatively, even in the normal constant-speed cruise mode, during HEV mode, the engine operating point may be determined on the OOL, and at this time, the torque distribution control for the engine 31 and the driving motor 32 may be performed to output the torque satisfying the required torque.

Further, as described above, in response to determining that the battery SOC condition has been satisfied in the S13 of FIG. 4, the controller 20 may be configured to perform the cruise control of the PnG mode in S14, and therefore, the vehicle may be driven in the PnG mode in which acceleration and deceleration are periodically alternated and repeated. In addition, as described above, when the vehicle is driven in the PnG mode and in response to determining that the PnG end condition has been satisfied in S15, the controller 20 may be configured to terminate the control of the PnG mode, and switch to the normal constant-speed cruise mode control in S16.

Herein, as the PnG end condition, when the driver has operated the UI device 11 to turn off the PnG mode (PnG "off"), or the battery SOC has been out of the range between the upper limit value and the lower limit value, the controller 20 may be configured to determine that the PnG end condition has been satisfied, and switch to the normal constant-speed cruise mode control. Meanwhile, the present disclosure is characterized by the PnG mode control using the preceding vehicle information, and hereinafter, the PnG mode control performed in the S14 of FIG. 4 will be described in detail.

Figure 5:
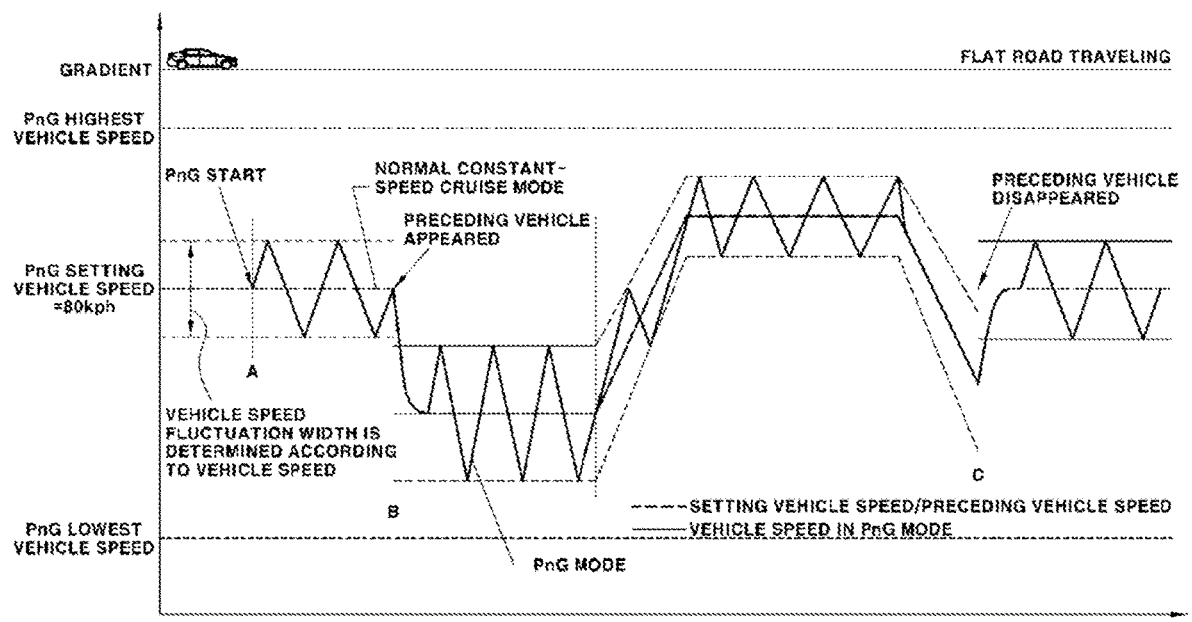
FIG. 5 is a diagram exemplifying a PnG control state where the preceding vehicle information has been reflected in the cruise control method according to an exemplary embodiment of the present disclosure.
Figure 6:
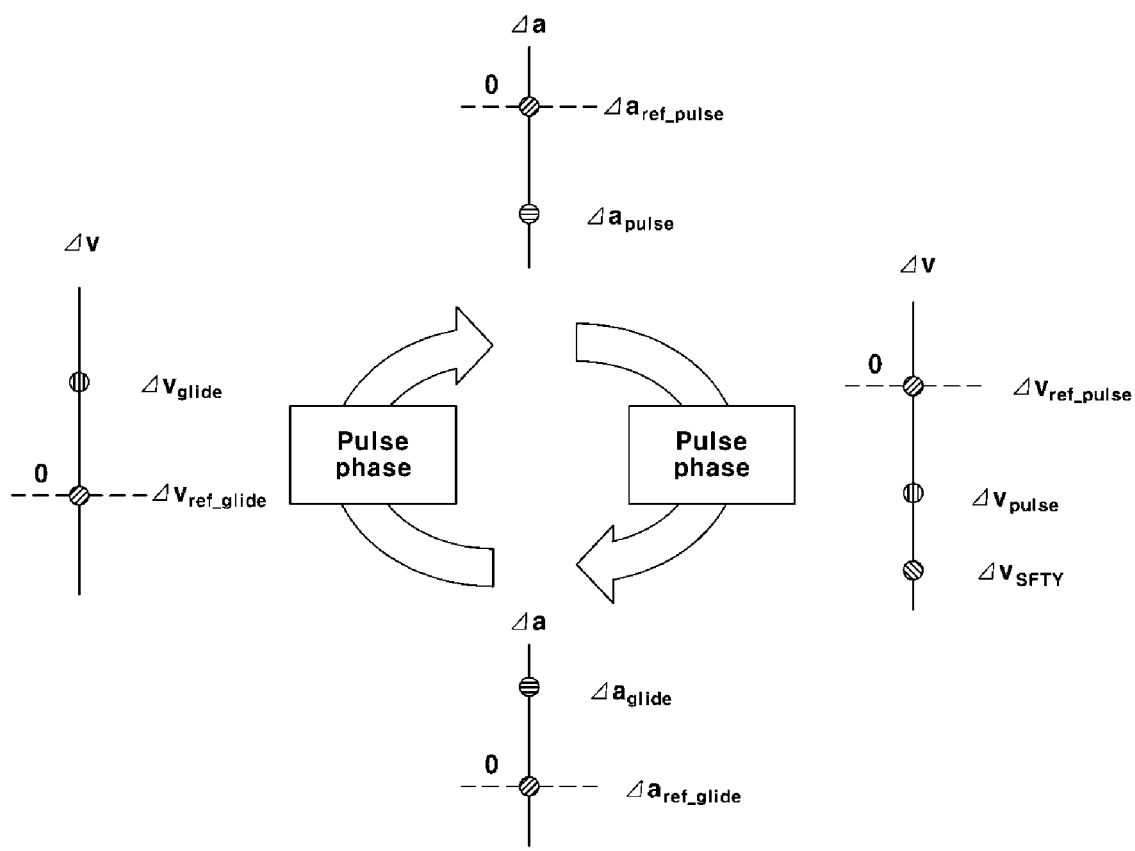
FIG. 6 is a diagram for explaining a relative acceleration and a relative speed with the preceding vehicle at the PnG control in the cruise control method according to an exemplary embodiment of the present disclosure.

FIG. 5 is a diagram exemplifying a control state of the PnG mode in which the preceding vehicle information has been reflected in the cruise control method according to the present disclosure, and FIG. 6 is a diagram for explaining the relative acceleration and the relative speed with the preceding vehicle at the PnG mode control in which the preceding vehicle information has been reflected in the cruise control method according to the present disclosure. In FIG. 5, the section between the time point A and the time point B, that is, the section A-B is a section in which the vehicle is driven in the PnG mode in which acceleration and deceleration are alternately repeated in a state where there is no preceding vehicle.

At the PnG mode control, the controller 20 may first be configured to determine the amount of the vehicle speed changed (a value of 'a' in FIG. 2), and then, in the condition where there is no preceding vehicle such as the section A-B, the controller 20 may be configured to determine the upper limit target vehicle speed and the lower limit target vehicle speed in which the amount of the vehicle speed changed has been reflected based on the vehicle speed set by the driver when the cruise mode is turned on, that is, the setting vehicle speed (becoming an average vehicle speed).

In the present disclosure, the setting vehicle speed set by the driver becomes the average vehicle speed during PnG traveling in which acceleration and deceleration are alternately repeated, and also becomes a reference vehicle speed for determining the upper limit target vehicle speed and the lower limit target vehicle speed. In an exemplary embodiment of the present disclosure, the amount of the vehicle speed changed may be determined from the setting vehicle speed in the controller 20, and at this time, the controller 20 may be configured to determine the amount of the vehicle speed changed corresponding to the setting vehicle speed by the map.

The controller 20 may be configured to determine the upper limit target vehicle speed by a value obtained by adding the amount of the vehicle speed changed to the driver setting vehicle speed that is the reference vehicle speed ('the setting vehicle speed+the amount of the vehicle speed changed'), and the lower limit target vehicle speed by a value obtained by subtracting the amount of the vehicle speed changed from the driver setting vehicle speed ('the setting vehicle speed−the amount of the vehicle speed changed').

As described above, when the upper limit target vehicle speed and the lower limit target vehicle speed are determined, the controller 20 may be configured to adjust the driving of the motor 32 or the driving of the motor 32 and the engine 31 to accelerate the vehicle to the upper limit target vehicle speed in the pulse phase section that is the acceleration section of the PnG mode.

At this time, the controller 20 may be configured to accelerate the vehicle to increase the vehicle speed detected by the vehicle speed detecting unit 14 at a predetermined speed slope or a predetermined speed profile. For this purpose, the controller 20 may be configured to accelerate the vehicle by varying the required torque, and the torque distribution control for the engine 31 and the motor 32 may be performed to output the torque satisfying the required torque necessary for the vehicle speed control at vehicle acceleration. Then, in the glide phase section that is the deceleration section, the controller 20 may be configured to apply the coast regenerative torque to decelerate the vehicle to the lower limit target vehicle speed by the energy recovery by the motor 32, and at this time, the controller 20 may be configured to apply the adjusted coast regenerative torque to reduce the vehicle speed at the predetermined speed slope or the predetermined speed profile.

As described above, during PnG mode traveling, the controller 20 may be configured to perform the upper limit and lower limit target vehicle speeds following control, and perform a control for the driving source of the vehicle so that the pulse phase (vehicle acceleration) and the glide phase (vehicle deceleration) are alternately repeated through a change in the required torque, etc.

In FIG. 5, the time point A is the start time point of the PnG mode, and the periodic change in the vehicle speed from the time point A to the time point B indicates that the vehicle travels in the PnG mode when being driven on the flat road in a state where there is no preceding vehicle in front. By using the setting vehicle speed set by the driver as the reference vehicle speed in the section A-B, the vehicle control may be performed to repeatedly increase or decrease the vehicle speed between the upper limit target vehicle speed obtained by adding the amount of the vehicle speed changed to the reference vehicle speed and the lower limit target vehicle speed obtained by subtracting the amount of the vehicle speed changed from the reference vehicle speed.

Meanwhile, the time point B is the time point when the preceding vehicle appears in front of the vehicle that is being driven in the PnG mode, the time point C is the time point when the preceding vehicle in front disappears, and the section B-C is the section where the following vehicle is being driven in the PnG mode in a state where there is the preceding vehicle. Herein, since the following vehicle is a vehicle on which the cruise control according to the present disclosure is performed, in the following description, the vehicle that performs the cruise control according to the present disclosure is referred to as 'the following vehicle' or 'the subject vehicle' in the description portion that requires distinction from the preceding vehicle.

Firstly, the controller 20 may be configured to determine whether there is the preceding vehicle being driven in front of the subject vehicle from the information input from the preceding vehicle detecting unit 12. In response to detecting the preceding vehicle, the controller may be configured to replace the setting vehicle speed and the reference vehicle speed for the cruise control of the following vehicle with the speed of the preceding vehicle.

In other words, in the section B-C where there is the preceding vehicle in front, the speed of the preceding vehicle becomes the setting speed in the normal constant-speed cruise mode and the target speed for maintaining the constant speed, and in addition, becomes the setting vehicle speed and the reference vehicle speed for determining the upper limit target vehicle speed and the lower limit target vehicle speed even during PnG mode traveling. Further, the speed of the preceding vehicle becomes the average vehicle speed of the following vehicle in the result of the PnG control in which the acceleration and deceleration of the vehicle are alternately repeated.

In summary again, the speed indicated by the dotted line in the section A-B in FIG. 5 may be the setting vehicle speed of the subject vehicle (e.g., vehicle speed set by the driver at the start of the cruise mode), and the speed indicated by the dotted line in the section B-C may be the speed of the preceding vehicle. In addition, the speeds indicated by the dotted lines in the sections A-B and B-C become the target vehicle speed when the PnG mode is turned off in the subject vehicle and the subject vehicle is being driven in the normal constant-speed cruise mode.

Further, the speeds indicated by the dotted lines in the sections A-B and B-C become the reference vehicle speed for determining the upper limit target vehicle speed and the lower limit target vehicle speed during PnG mode traveling, and in addition, become the average vehicle speed of the subject vehicle that is being driven in the PnG mode. The controller 20 may be configured to estimate the speed of the preceding vehicle from the input information from the preceding vehicle detecting unit 12, and the preceding vehicle detecting unit 12 may include an inter-vehicle distance sensor.

Herein, the inter-vehicle distance sensor may be a radar sensor configured to detect the inter-vehicle distance between the subject vehicle and the preceding vehicle in real time while the vehicle is being driven, and the radar sensor may be one of advanced driver assistance system (ADAS) sensors, that is, a radar sensor of the ADAS. In the present disclosure, the preceding vehicle detecting unit 12 may be configured to calculate the relative speed with the preceding vehicle based on the inter-vehicle distance detected using the radar sensor, and the relative speed calculated by the preceding vehicle detecting unit 12 may be supplied to the controller 20. In addition, the controller 20 may use the vehicle speed of the subject vehicle detected by the vehicle speed detecting unit 14 to estimate the speed of the preceding vehicle, and may be configured to estimate the speed of the preceding vehicle from the relative speed with the preceding vehicle and the detected vehicle speed of the subject vehicle.

As described above, when the controller 20 determines the speed of the preceding vehicle, the determined speed of the preceding vehicle may be used as the setting vehicle speed (e.g., target vehicle speed, reference vehicle speed) for the constant-speed control of the normal constant-speed cruise mode and the acceleration and deceleration control of the PnG mode in the following vehicle, instead of the setting vehicle speed set by the driver, during the section B-C.

The amount of the vehicle speed changed for determining the upper limit target vehicle speed and the lower limit target vehicle speed in the following vehicle even in the section B-C may be determined by the map from the setting vehicle speed in the controller 20 as in the section A-B, and at this time, the setting vehicle speed for determining the amount of the vehicle speed changed from the map is the speed of the preceding vehicle as described above. In addition, even in the section B-C as in the section A-B, the upper limit target vehicle speed may be determined by a value obtained by adding the amount of the vehicle speed changed to the setting vehicle speed (e.g., reference vehicle speed) that is the speed of the preceding vehicle ('the setting vehicle speed+the amount of the vehicle speed changed'), and the lower limit target vehicle speed may be determined by a value obtained by subtracting the amount of the vehicle speed changed from the setting vehicle speed (e.g., reference vehicle speed) that is the speed of the preceding vehicle ('the setting vehicle speed–the amount of the vehicle speed changed').

In the present disclosure, even at the PnG mode control in the sections A-B and B-C and furthermore, after the time point C, the vehicle speed fluctuation width that is the difference between the upper limit target vehicle speed and the lower limit target vehicle speed becomes twice the amount of the vehicle speed changed, and since the amount of the vehicle speed changed may be determined by the map from the setting vehicle speed (which is the setting vehicle speed of the subject vehicle or the speed of the preceding vehicle) in the controller 20, the vehicle speed fluctuation width may also be determined according to the setting vehicle speed.

Referring to FIG. 5, the lower the setting vehicle speed (which is the reference vehicle speed and the average vehicle speed) is, the greater the vehicle speed fluctuation width is, and thus, the amount of the vehicle speed changed may be set to a greater value as the setting vehicle speed is lower from the map of the controller 20. Then, after the time point C of FIG. 5, the controller 20 may return to the PnG mode control (same as the section A-B) when there is no preceding vehicle.

As described above, when the preceding vehicle is traveling in front of the subject vehicle, the upper limit target vehicle speed and the lower limit target vehicle speed may be determined using the speed of the preceding vehicle as the setting vehicle speed (e.g., reference vehicle speed) in both the pulse phase and the glide phase, in the PnG mode control of the following vehicle, and at this time, the controller 20 may be configured to perform the acceleration control in the pulse phase and the deceleration control in the glide phase using the determined upper limit target vehicle speed and lower limit target vehicle speed.

When the upper limit target vehicle speed and the lower limit target vehicle speed are determined in the presence of the preceding vehicle, there is no difference in comparison between a basic control procedure for accelerating or decelerating the vehicle until reaching the determined upper and lower limit target vehicle speeds and the case where there is no preceding vehicle.

FIG. 6 schematically exemplifies by distinguishing the pulse phase and the glide phase with respect to the relative acceleration $\Delta a$ with the preceding vehicle and the relative speed $\Delta V$ with the preceding vehicle in the PnG mode. In the following description, the relative acceleration $\Delta a$ refers to the relative acceleration with the preceding vehicle, and this is defined as 'the acceleration of the preceding vehicle–the acceleration of the following vehicle.' In addition, in the following description, the relative speed $\Delta V$ refers to the relative speed with the preceding vehicle, and this is defined as 'the speed of the preceding vehicle–the speed of the following vehicle.'

In FIG. 6, $\Delta a_{pulse}$ refers to the relative acceleration in the pulse phase that is the acceleration section, $\Delta a_{glide}$ refers to the relative acceleration in the glide phase that is the deceleration section, $\Delta V_{pulse}$ refers to the relative speed in the pulse phase, and $\Delta V_{glide}$ refers to the relative speed in the glide phase. In addition, $\Delta a_{ref\_pulse}$ refers to the relative acceleration reference value in the pulse phase, $\Delta a_{ref\_glide}$ refers to the relative acceleration reference value in the glide phase, $\Delta V_{ref\_pulse}$ refers to the relative speed reference value in the pulse phase, and $\Delta V_{ref\_glide}$ refers to the relative speed reference value in the glide phase.

Firstly, in the pulse phase of the PnG mode, when the speed of the preceding vehicle is a constant speed, the following vehicle is in an accelerating state, such that the relative acceleration $\Delta a_{pulse}$ may be a negative (−) value less than zero. In the pulse phase of the PnG mode, the speed of the following vehicle that is accelerating in the pulse phase becomes greater (i.e., becomes higher) than the speed of the preceding vehicle, such that the relative speed $\Delta V_{pulse}$ in the pulse phase may be a negative (−) value.

In addition, in the pulse phase of the PnG mode, the following vehicle is in an accelerating state, such that the following vehicle will be getting closer to the preceding vehicle (e.g., the distance therebetween decreases) in a state where both the relative acceleration $\Delta a_{pulse}$ and the relative speed $\Delta V_{pulse}$ are negative (−) values. Therefore, in the present disclosure, the safety distance may be previously set in the controller 20 to prevent the following vehicle traveling in the PnG mode from getting closer to the preceding vehicle than a specific distance. In other words, the distance between the vehicles may be maintained to be less than a threshold distance. The safety distance prevents the following vehicle that alternately repeats acceleration and deceleration from colliding with the preceding vehicle, and is the inter-vehicle distance that is previously set for the safe traveling of the vehicle in the distance between the preceding vehicle and the following vehicle.

In the present disclosure, when the following vehicle gets closer to the preceding vehicle and the distance with the preceding vehicle reaches the predetermined safety distance during the pulse phase, the controller 20 may be configured to switch from the pulse phase to the glide phase even before reaching the upper limit target vehicle speed to operate the driving source of the vehicle to decelerate the vehicle. When the following vehicle traveling in the PnG mode is following the preceding vehicle from a distance much farther than the safety distance from the preceding vehicle, the following vehicle may not reach the safety distance position until reaching the upper limit target vehicle speed at the acceleration of the pulse phase, and at this time, the following vehicle may be accelerated to the upper limit target vehicle speed. However, when the distance with the preceding vehicle reaches the safety distance while the following vehicle is accelerated toward the upper limit target vehicle speed, the following vehicle immediately switches to the glide mode to perform a deceleration control, thereby preventing the vehicle collision.

In FIG. 6, $\Delta V_{SFTY}$ of the pulse phase is relevant to the safety distance, and indicates the relative speed between two vehicles (=the speed of the preceding vehicle–the speed of the following vehicle) at the time point reaching the safety distance, when the following vehicle being driven in the PnG mode has accelerated during the pulse phase and the distance with the preceding vehicle has reached the safety distance. In other words, the relative speed at the time point when the following vehicle is separated from the preceding vehicle by the safety distance is exemplified as $\Delta V_{SFTY}$.

Assuming that the speed of the preceding vehicle is constant during the pulse phase, the following vehicle is accelerating until reaching the upper limit target vehicle speed, such that as the time has elapsed, the relative speed $\Delta V_{pulse}$ that is a negative (−) value in FIG. 6(2) becomes gradually larger based on the absolute value thereof, and at this time, the following vehicle gets closer to the preceding vehicle. In addition, when the relative speed $\Delta V_{pulse}$ becomes gradually larger based on the absolute value thereof, that is, when the relative speed $\Delta V_{pulse}$ in FIG. 6(2) moves downwards in the drawing, the $\Delta V_{pulse}$ becomes the $\Delta V_{SFTY}$ when the following vehicle reaches the safety distance with the preceding vehicle.

Further, assuming that the speed of the preceding vehicle is constant during the pulse phase, only the following vehicle is accelerating, such that the relative acceleration $\Delta a_{pulse}$ indicates a negative (−) value as shown in FIG. 6(1). Then, in the glide phase of the PnG mode, when the speed of the preceding vehicle is a constant speed, the following vehicle is in a decelerating state, such that the relative acceleration $\Delta a_{glide}$ may be a positive (+) value greater than zero.

In addition, in the glide phase of the PnG mode, the speed of the following vehicle that is decelerating in the glide phase becomes smaller (that is, becomes lower) than the speed of the preceding vehicle, such that the relative speed $\Delta V_{glide}$ in the pulse phase may be a positive (+) value. In the glide phase of the PnG mode, the following vehicle is in a decelerating state, such that the following vehicle will gradually become farther from the preceding vehicle in a state where both the relative acceleration $\Delta a_{glide}$ and the relative speed $\Delta V_{glide}$ are positive (+) values.

Assuming that the speed of the preceding vehicle is constant during the glide phase, the following vehicle is decelerating until reaching the lower limit target vehicle speed, such that as the time has elapsed, the relative speed $\Delta V_{glide}$ that is a positive (+) value in FIG. 6(4) gradually becomes larger based on the absolute value thereof, and at this time, the following vehicle gradually becomes farther away from the preceding vehicle (e.g., the distance there between increases). In addition, assuming that the speed of the preceding vehicle is constant during the glide phase, only the following vehicle is decelerating, such that the relative acceleration $\Delta a_{glide}$ indicates a positive (+) value as shown in FIG. 6(3).

Figure 7:
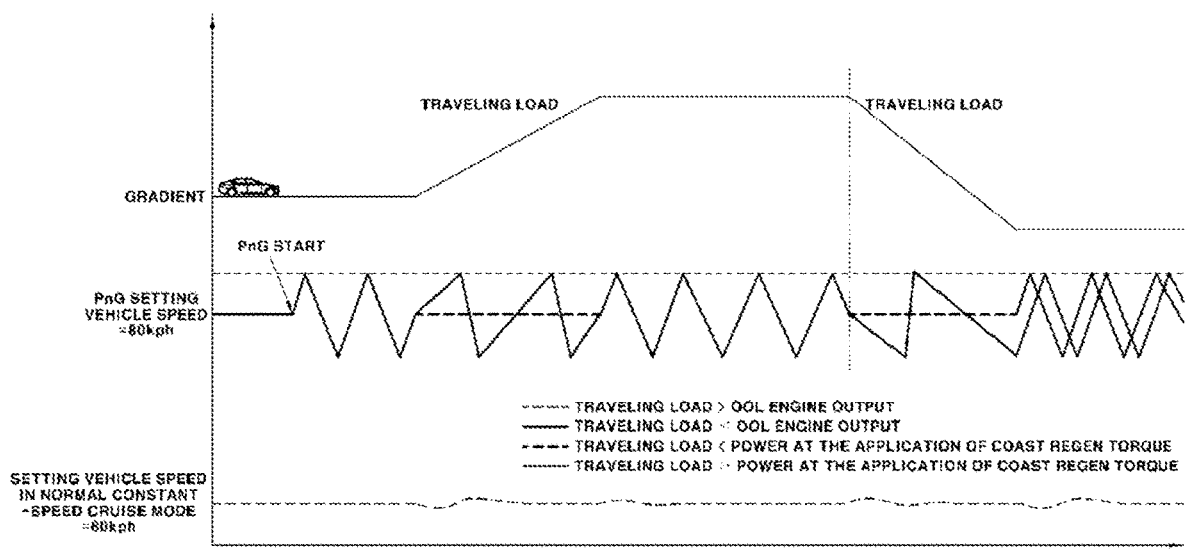
FIG. 7 is a diagram exemplifying the PnG control state when traveling the road with gradient in the cruise control method according to an exemplary embodiment of the present disclosure.

Meanwhile, FIG. 7 is a diagram exemplifying a control state of the PnG mode when the vehicle is being driven on the flat road and the ramp with gradient in the cruise control method according to the present disclosure, and exemplifies the case where there is no preceding vehicle. In the present disclosure, the controller 20 may be configured to receive the information regarding the forward road from the road information providing unit 13 while the vehicle is being driven in the PnG mode, and may be configured to acquire the information regarding the distance to the forward ramp and the gradient of the forward ramp, etc. from the information on the forward road input from the road information providing unit 13.

In the present disclosure, the road information providing unit 13 may be a navigation device installed in the vehicle, and when the driver sets a destination in the navigation device, the navigation device may be configured to provide the controller 20 with the information regarding the forward road. In addition, when the vehicle is being driven in the PnG mode, the controller 20 may be configured to perform the normal PnG mode control in which the vehicle acceleration and the vehicle deceleration are alternately repeated by using the upper limit target vehicle speed and the lower limit target vehicle speed determined from the setting vehicle speed set by the driver while the vehicle is driven on the flat road.

In addition, when the vehicle enters and travels on the uphill road, the controller 20 may be configured to calculate a vehicle traveling load when assuming that the vehicle is driven at the setting vehicle speed in the gradient condition of the forward uphill road, based on the information regarding the forward road, and at this time, may be configured to temporarily stop the PnG mode control on the uphill road when the traveling load is greater than the OOL engine output (PnG mode temporary off). In other words, when the traveling load is greater than the OOL engine output for acceleration, the controller 20 may be configured to operate the vehicle to drive at a constant speed at the setting vehicle speed set by the driver, and return to the PnG mode control when the traveling load is equal to or less than the OOL engine output again, or when the vehicle passes through the uphill road to travel on the flat road again.

When the traveling load is equal to or less than the OOL engine output from the beginning even when the vehicle enters and travels on the uphill road, the controller 20 may be configured to perform the PnG mode control in the same manner as described above. In addition, when the vehicle enters and travels on the downhill road, the controller 20 may be configured to calculate the vehicle traveling load when assuming that the vehicle travels at the setting vehicle speed in the gradient condition of the forward downhill road, based on the information on the forward road, and at this time, may be configured to temporarily stop the PnG mode control on the downhill road when the traveling load is less than the power corresponding to the coast regen. torque for deceleration (e.g., PnG mode temporary off).

In other words, when the traveling load is less than the motor power at the application of the coast regenerative torque for deceleration, the controller 20 does not perform the PnG mode control and may be configured to operate the vehicle at a constant speed at the setting vehicle speed set by the driver, and return to the PnG mode control when the traveling load is equal to or greater than the power corresponding to the coast regenerative torque again, or when the vehicle passes through the downhill road to travel on the flat road again. When the traveling load is equal to or greater than the power corresponding to the coast regenerative torque from the beginning even when the vehicle enters and travels on the downhill road, the controller 20 may be configured to perform the PnG mode control in the same manner as described above.

Figure 8:
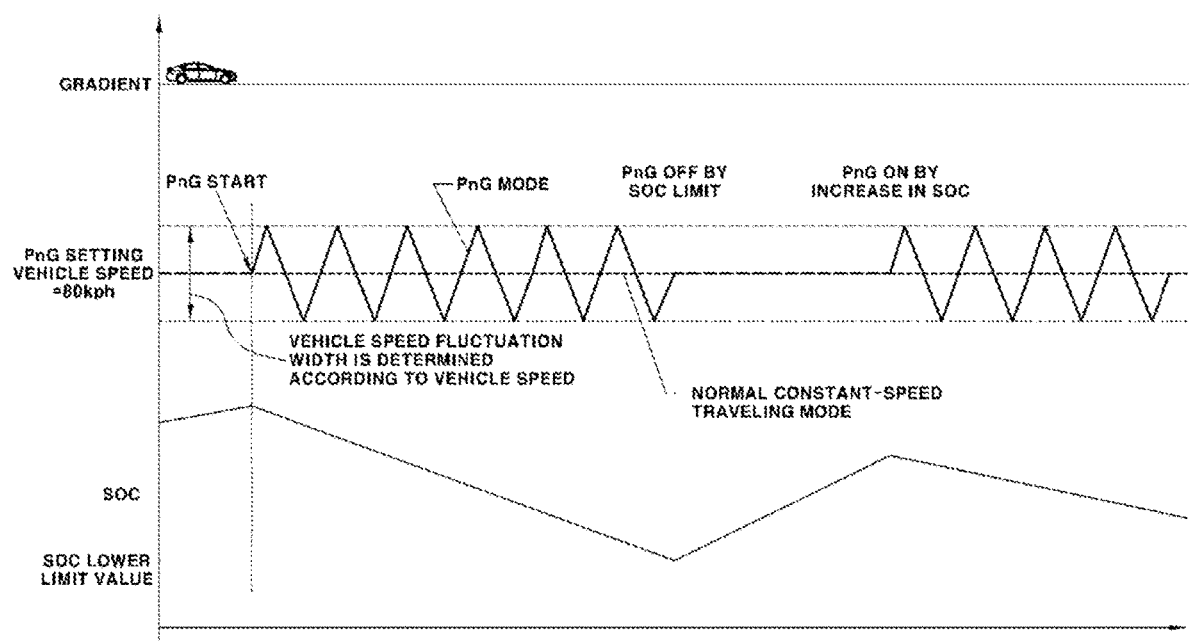
FIG. 8 is a diagram exemplifying a control state according to the system limit information of the vehicle in the cruise control method according to an exemplary embodiment of the present disclosure.

In the present specification, since a method for determining the traveling load when the vehicle travels on the ramp using the information such as the gradient of the ramp and the vehicle speed is a well-known technology, a detailed description thereof will be omitted. Next, FIG. 8 is a diagram exemplifying a control state according to the system limit information of the vehicle in the cruise control method according to the present disclosure.

As shown, the condition that the battery SOC gradually decreases to reach a SOC lower limit value set in the controller 20 may be a system limit condition during PnG mode traveling, and when the battery SOC gradually decreases to reach the SOC lower limit value, the PnG mode control may be temporarily stopped (e.g., PnG mode temporary off). At this time, the controller 20 does not perform the PnG mode control and may be configured to operate the vehicle at constant speed at the setting vehicle speed set by the driver, and thereafter, set to perform the PnG mode control again when the battery SOC increases to reach a value equal to or greater than the setting value from the SOC lower limit value during constant-speed traveling.

As described above, the returning to the PnG mode again when the PnG mode has been temporarily stopped due to the battery SOC and thereafter, the battery SOC has increased may be applied to both the case where there is the preceding vehicle and the case where there is no preceding vehicle as in FIG. 5.

As described above, although the exemplary embodiments of the present disclosure have been described in detail, the claims of the present disclosure is not limited to the above-described exemplary embodiments, and various modifications and improvements by those skilled in the art using the basic concept of the present disclosure defined in the appended claims may also be included the claims of the present disclosure.

What is claimed is:

1. A cruise control method for a hybrid vehicle, comprising:
sensing, by a controller, whether a Pulse and Glide (PnG) mode has been operated after a setting vehicle speed has been set by a driver and a cruise mode has been turned on in the hybrid vehicle using an engine and a motor as a driving source of the hybrid vehicle;
determining, by the controller, whether a preceding vehicle is detected;
estimating, by the controller, a speed of the preceding vehicle that is present in front of the hybrid vehicle from an information input from a preceding vehicle detecting unit in an on state of the PnG mode;
determining, by the controller, an upper limit target vehicle speed and a lower limit target vehicle speed from the estimated speed of the preceding vehicle when the preceding vehicle appears in front of the hybrid vehicle;
operating, by the controller, the driving source of the hybrid vehicle to alternately repeat acceleration (pulse phase) and deceleration (glide phase) of the hybrid vehicle between the determined upper limit target vehicle speed and lower limit target vehicle speed;
stopping, by the controller, the operation of the driving source for alternately repeating an acceleration and deceleration; and
operating, by the controller, the driving source to operate the hybrid vehicle at a constant speed at the setting vehicle speed set by the driver, when a battery state of charge (SOC) decreases to reach a predetermined SOC lower limit value, while operating the driving source.

2. The cruise control method for the hybrid vehicle of claim 1, wherein the upper limit target vehicle speed is determined by a value obtained by adding a predetermined amount of a vehicle speed variation to the estimated speed of the preceding vehicle, and the lower limit target vehicle speed is determined by a value obtained by subtracting the predetermined amount of the vehicle speed variation from the estimated speed of the preceding vehicle.

3. The cruise control method for the hybrid vehicle of claim 2, wherein an amount of the vehicle speed variation is determined by the controller as a value corresponding to the speed of the preceding vehicle.

4. The cruise control method for the hybrid vehicle of claim 1, wherein when there is no preceding vehicle in front of the hybrid vehicle, the controller is configured to:
determine the upper limit target vehicle speed and the lower limit target vehicle speed from the setting vehicle speed set by the driver; and
operate the driving source to alternately repeat the acceleration and deceleration of the hybrid vehicle between the upper limit target vehicle speed and the lower limit target vehicle speed determined from the setting vehicle speed.

5. The cruise control method for the hybrid vehicle of claim 4, further comprising:
stopping, by the controller, the operation of the driving source, and operating the driving source to operate the hybrid vehicle at a constant speed at the setting vehicle speed set by the driver, when a battery state of charge (SOC) decreases to reach a predetermined SOC lower limit value while operating the driving source, in a case where there is no preceding vehicle; and
operating, by the controller, the driving source to alternately repeat the acceleration and deceleration again, when the battery SOC increases to reach a value equal to or greater than a setting value from the SOC lower limit value.

6. The cruise control method for the hybrid vehicle of claim 4, wherein when there is no preceding vehicle in front of the hybrid vehicle, the upper limit target vehicle speed is determined by a value obtained by adding a predetermined amount of the vehicle speed variation to the setting vehicle speed, and the lower limit target vehicle speed is determined by a value obtained by subtracting the predetermined amount of the vehicle speed variation from the setting vehicle speed.

7. The cruise control method for the hybrid vehicle of claim 4, wherein while operating the driving source to alternately repeat the acceleration and deceleration of the hybrid vehicle between the upper limit target vehicle speed and the lower limit target vehicle speed determined from the setting vehicle speed, the method further includes:
receiving, by the controller, information regarding a forward road from a road information providing unit,
calculating, by the controller, a vehicle traveling load when the vehicle travels at the setting vehicle speed in a gradient condition of an uphill road when the forward road is the uphill road, based on the information regarding the forward road,
stopping, by the controller, the operation of the driving source for alternately repeating the acceleration and deceleration of the hybrid vehicle on the forward uphill road, when the calculated vehicle traveling load is greater than an engine optimal operating line (OOL) engine output, and
operating, by the controller, the driving source to operate the hybrid vehicle at a constant speed at the setting vehicle speed.

8. The cruise control method for the hybrid vehicle of claim 4, wherein while operating the driving source to alternately repeat the acceleration and deceleration of the hybrid vehicle between the upper limit target vehicle speed and the lower limit target vehicle speed determined from the setting vehicle speed, the method includes:
receiving, by the controller, information regarding a forward road from a road information providing unit,
calculating, by the controller, a vehicle traveling load when the hybrid vehicle travels at the setting vehicle speed in a gradient condition of a downhill road when the forward road is the downhill road, based on the information regarding the forward road,
stopping, by the controller, the operation of the driving source that alternately repeats the acceleration and deceleration of the hybrid vehicle on the forward downhill road, when the calculated vehicle traveling load is less than a power corresponding to a coast regenerative torque at a deceleration of the hybrid vehicle, and
operating, by the controller, the driving source to operate the hybrid vehicle at a constant speed at the setting vehicle speed.

9. The cruise control method for the hybrid vehicle of claim 6, wherein an amount of the vehicle speed variation is determined by a value corresponding to the setting vehicle speed in the controller.

10. The cruise control method for the hybrid vehicle of claim 1, wherein when the cruise mode has been turned on and then the PnG mode is turned off, operating, by the controller, the driving source to operate the hybrid vehicle at a constant speed at the setting vehicle speed set by the driver.

11. The cruise control method for the hybrid vehicle of claim 1, wherein in the operation of the driving source, at the acceleration of the hybrid vehicle, the controller is configured to:
   operate the hybrid vehicle by power of the motor or a combined power of the motor and the engine, and
   operate the engine with an operating point on an engine optimal operating line (OOL) when the hybrid vehicle travels by the combined power.

12. The cruise control method for the hybrid vehicle of claim 1, wherein in the operation of the driving source, at a deceleration of the hybrid vehicle, opening, by the controller, an engine clutch disposed between the engine and the motor and recovering energy by the motor in a transmission in gear state.

13. The cruise control method for the hybrid vehicle of claim 1, further comprising:
   determining, by the controller, whether a battery state of charge (SOC) has been within a range between a predetermined upper limit value and a predetermined lower limit value, and
   operating, by the controller, the driving source to alternately repeat the acceleration and deceleration of the hybrid vehicle, when the battery SOC is within the range between an upper limit value and a lower limit value.

14. The cruise control method for the hybrid vehicle of claim 1, further comprising:
   operating, by the controller, the driving source to operate the hybrid vehicle at a constant speed at the setting vehicle speed set by the driver, when the PnG mode is turned off by the driver, or a battery state of charge (SOC) is out of a range between an upper limit value and lower limit value, while operating the driving source to alternately repeat the acceleration and deceleration of the hybrid vehicle.

15. The cruise control method for the hybrid vehicle of claim 1, further comprising:
   operating, by the controller, the driving source to alternately repeat the acceleration and deceleration again, when the battery SOC increases to reach a value equal to or greater than a setting value from the SOC lower limit value.

16. A cruise control system for a hybrid vehicle, comprising:
   a memory configured to store program instructions; and
   a processor configured to execute the program instructions, the program instructions when executed configured to:
      sense whether a Pulse and Glide (PnG) mode has been operated after a setting vehicle speed has been set by a driver and a cruise mode has been turned on in the hybrid vehicle using an engine and a motor as a driving source of the hybrid vehicle;
      estimate a speed of a preceding vehicle that is present in front of the hybrid vehicle from an information input from a preceding vehicle detecting unit in an on state of the PnG mode;
      determine an upper limit target vehicle speed and a lower limit target vehicle speed from the estimated speed of the preceding vehicle;
      operate the driving source to alternately repeat acceleration (pulse phase) and deceleration (glide phase) of the hybrid vehicle between the determined upper limit target vehicle speed and lower limit target vehicle speed;
      stop the operation of the driving source for alternately repeating the acceleration and deceleration; and
      stop the operation of the driving source for alternately repeating the acceleration and deceleration; and
      operate the driving source to operate the hybrid vehicle at a constant speed at the setting vehicle speed set by the driver, when a battery state of charge (SOC) decreases to reach a predetermined SOC lower limit value, while operating the driving source.

* * * * *